(12) United States Patent
MacLachlan

(10) Patent No.: US 6,550,604 B2
(45) Date of Patent: Apr. 22, 2003

(54) SELF-CLEARING VIBRATING ARTICLE-TRANSFER MECHANISM

(75) Inventor: Gilbert J. MacLachlan, Chalmette, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 10/060,182

(22) Filed: Jan. 30, 2002

(65) Prior Publication Data

US 2002/0100663 A1 Aug. 1, 2002

Related U.S. Application Data

(60) Provisional application No. 60/265,545, filed on Jan. 31, 2001.

(51) Int. Cl.[7] .............................................. B65G 25/00
(52) U.S. Cl. ..................... 198/614; 198/635; 198/750.1
(58) Field of Search .................. 198/614, 635, 198/750.1

(56) References Cited

U.S. PATENT DOCUMENTS

| 4,258,779 | A | * | 3/1981 | Musschoot | 198/752 |
| 4,391,560 | A | * | 7/1983 | Fardin | 414/107 |
| 4,763,770 | A | * | 8/1988 | Zagorzycki et al. | 198/364 |
| 4,907,938 | A | * | 3/1990 | Pesch et al. | 414/749 |
| 5,038,918 | A | * | 8/1991 | McRae | 198/609 |
| 5,058,725 | A | * | 10/1991 | Gamberini et al. | 198/612 |
| 5,105,930 | A | * | 4/1992 | Spatafora et al. | 198/580 |
| 5,558,199 | A | * | 9/1996 | Roether et al. | 198/614 |
| 5,873,448 | A | * | 2/1999 | Tsai et al. | 198/406 |

* cited by examiner

*Primary Examiner*—Douglas Hess
(74) *Attorney, Agent, or Firm*—James T. Cronvich

(57) ABSTRACT

A self-clearing article-transfer plate for a conveyor system. The plate is disposed between an upstream article feeder, such as a conveyor belt supplying a stream of conveyed articles, and a downstream article receiver, such as a take-away belt or an accumulation table. The plate may have a tapered edge or a fingered edge at a first end for receiving articles from the article feeder. Backpressure from the stream of articles pushes the articles onto, across, and off a second opposite end of the plate onto the article receiver. When the stream of articles stops or is interrupted, the last articles in the stream are urged along the plate from the first end to the second end by vibrations from a vibrator affixed to a support for the plate. In this way, articles are cleared from the plate, without being stranded, even in the absence of backpressure.

12 Claims, 3 Drawing Sheets

SELF-CLEARING VIBRATING ARTICLE-TRANSFER MECHANISM

This application claims the benefit of U.S. Provisional Patent Application No. 60/265,545, filed on Jan. 31, 2001.

BACKGROUND

This invention relates generally to conveyor systems and, more specifically, to an article-transfer plate positioned to receive and transfer conveyed articles as they come off a conveyor section.

Conveyor belts or chains are used to transfer articles in many applications. In the beverage industry, for example, cans or bottles are transported through the plant on conveyor belts through manufacturing processes such as filling, pasteurizing, capping, labeling, and packaging. Until they are packaged, the individual bottles are transported in a stream along the belts. It is important that the bottles remain upright to prevent product from spilling and to prevent jams in the conveying line or at the processing stations. Because bottles are often top-heavy with relatively small bases, any discontinuity in the conveying path presents a tipping hazard.

Often it is necessary to transfer bottles from one conveyor belt to another. The gaps at transfer points between the two belts are typically filled with a deadplate across which the bottles are pushed by the backpressure of the steady stream of bottles on the upstream conveyor. The deadplate is positioned to minimize the size of the discontinuity between belts for smooth transfer. When the upstream conveyor is turned off or at the end of a manufacturing run, the last of the bottles can become stranded on the deadplate because there are no trailing bottles to push them along. Stranded bottles are frequently cleared by hand or by automated clearing systems similar to the bowling pin sweeper familiar to all. The manual clearing system requires manpower; automated systems, such as that described, are expensive and complex.

Thus, there is a need for a simple means to avoid stranding articles, such as bottles, at transfer points between conveyor sections in a conveyor system.

SUMMARY

This need and others are solved by a novel article-transfer mechanism having features of the invention. The article-transfer mechanism includes a plate positioned between an upstream article feeder, such as conveyor belt, and a downstream article receiver, such as another conveyor belt or an article-accumulation area. The plate extends from a first end close to the upstream article feeder to a second end close to the downstream article receiver. The backpressure of a continuous stream of articles fed by the upstream article feeder pushes the articles onto the plate and across it to transfer the articles to the downstream article receiver. A vibrator coupled to the plate vibrates the plate to urge articles at the end of the stream from the first end toward the second end of the plate in the absence of backpressure. In this way, the article-transfer mechanism makes the plate self-clearing so that no articles are left stranded on the plate.

In another version of the article-transfer mechanism, the first end of the plate is disposed at a higher elevation than the second end of the plate to get an assist from gravity in urging the articles along the plate. A tilt of about 3° off horizontal is preferred. In another version, the vibrator, which is preferably pneumatically driven, vibrates the plate in the direction of flow of the stream of articles between the first and second ends of the plate. In an alternative version, the vibrator vibrates the plate up and down. In yet another version, the vibrator is actuated only when the upstream article feeder is not feeding articles to the plate.

In another version of the invention, a conveyor system comprises a conveyor belt, a downstream article receiver, and an article-transfer mechanism disposed between the conveyor belt and the article receiver. The article-transfer mechanism includes a plate for receiving the stream of articles from the upstream conveyor belt and transferring the stream of articles to the downstream article receiver and a vibrator coupled to the plate to vibrate the plate. The vibration of the plate urges articles at the end of the stream across the plate and onto the downstream article receiver to avoid stranding articles on the plate.

Thus, the article-transfer mechanism of the invention eliminates the stranding of articles on a deadplate between conveyor sections.

BRIEF DESCRIPTION OF THE DRAWINGS

These and other advantages, features, and aspects of the invention are described in more detail in the following description, appended claims, and accompanying drawings in which:

DETAILED DESCRIPTION

Figure 1:
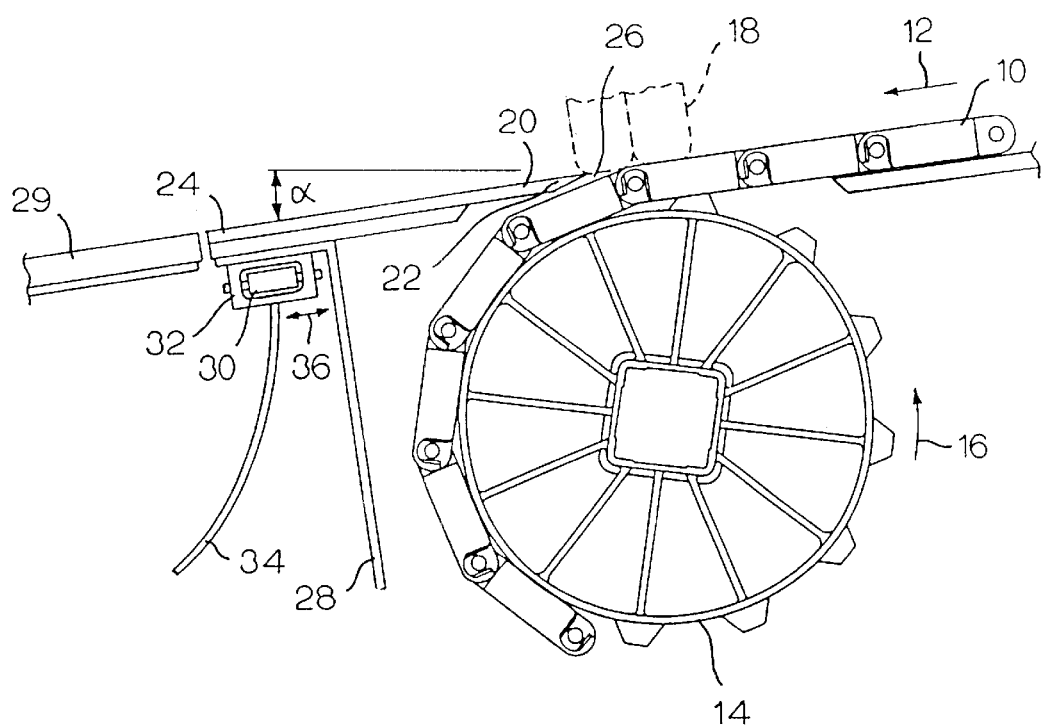
FIG. 1 is a side elevation view, partly cut away, of an article-transfer mechanism embodying features of the invention depicting a portion of a conveyor system with a deadplate.

A portion of one version of a conveyor system with an article-transfer mechanism embodying features of the invention is shown in FIG. 1. A conveyor belt 10, depicted as a modular plastic conveyor belt, is driven in the direction of arrow 12 by one or more drive sprockets 14 rotated in the direction of arrow 16 by a drive system, including a drive motor and a shaft (not shown). As the belt articulates about the drive sprocket, articles 18 conveyed on the top surface of the belt are received from the belt by a plate 20 having a tapered first end 22, cantilevered over the sprocket portion of the belt, and an opposite second end 24. The belt feeds a stream of articles over the gap 26 separating the belt from the first end 22 of the plate. The articles are pushed along the top of the plate by the backpressure of the continuous stream of articles fed by the belt, which acts as an upstream article feeder. The plate 20 is firmly attached to and supported by a support 28. A downstream article receiver 29, depicted in FIG. 1 as an article-receiving table, collects articles transferred off the second end 24 of the closely positioned plate. As long as the feeder belt 10 supplies a constant stream of articles, the backpressure slides articles across the plate to the downstream article receiver.

Once the article-feeding belt stops or the supply of articles is interrupted, backpressure drops and articles on the plate are not pushed along. To prevent articles from being stranded on the plate, a vibrator 30 is fastened to a bracket 32 welded or otherwise affixed to the support 28. The vibrator—in this example, a pneumatic device, such as the Model NTK 8 AL Pneumatic Oscillator, sold by Martin Engineering of Neponset, Ill., USA—is attached by an air line 34 to a source of high-pressure air. Air pressure applied to the vibrator causes it to vibrate rapidly back and forth in the direction of the flow of the stream as indicated by arrow 36. The rapid vibration of the plate urges articles received on it to advance along the plate toward the second end and off onto the downstream article receiver. Although the vibrator could remain actuated at all times, it is preferably actuated only when there is an interruption in the supply of articles to the plate. The vibrator is preferably then deactuated as soon as the plate is cleared of articles. In this way, the article-transfer mechanism is self-clearing, eliminating the stranding of articles on the plate in the absence of backpressure.

To further assist in urging the articles along the vibrating plate, the plate can be disposed with its first end 22 at a higher elevation than its second end 24. With the plate tilted off horizontal at an angle α, gravity helps the articles slide along the downwardly sloped, vibrating plate. A preferred tilt angle α of about 3° off horizontal works well.

Figure 2B:
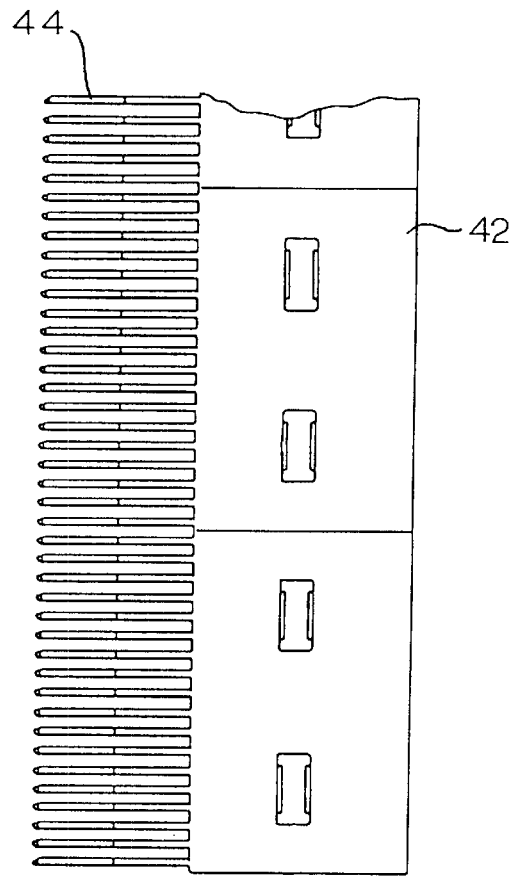
FIG. 2B is a partial top plan view of the finger transfer plate of FIG. 2A.
Figure 2A:
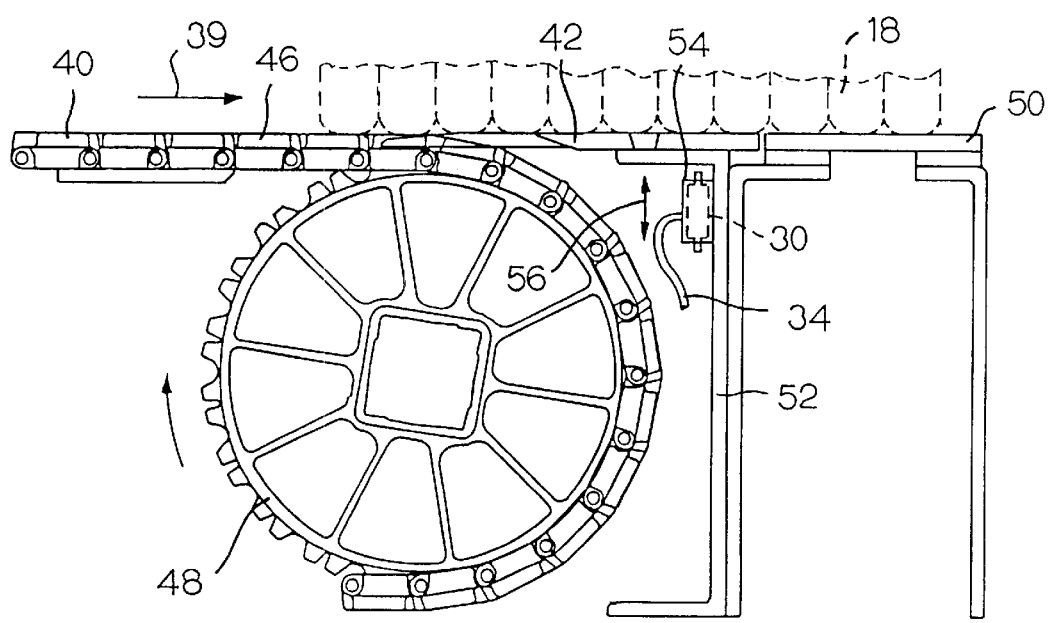
FIG. 2A is a side elevation view of another arrangement of an article-transfer mechanism as in FIG. 1, but with a finger transfer plate.

Another version of self-clearing article-transfer mechanism is shown in FIGS. 2A and 2B. In this version, a stream of articles 18 is fed in the direction of arrow 39 by upstream article-feeding belt 40, depicted as a raised rib belt, such as the INTRALOX Series 900 Raised Rib belt manufactured by Intralox, Inc. of Harahan, La. The article-receiving plate in this example is a finger transfer plate 42, such as is also available from Intralox, Inc. The finger transfer plate includes a plurality of spaced side-by-side fingers 44 along a first end that fit in the spaces between the raised longitudinal ribs 46 forming the top conveying surface of the belt. The finger transfer plate strips articles from the belt as it articulates about its drive sprocket 48. The backpressure of the stream of articles fed by the belt pushes the articles across the finger plate to a downstream article-receiving table 50. As in the example of FIG. 1, the finger plate is firmly affixed to a support 52. A vibrator 30 is fastened to a bracket 54 welded to the support. In this example, the vibrator is attached in such a way that it vibrates the finger plate up and down in the direction of arrow 56. This vertical vibration urges articles from the first end of the finger plate to the second end and off onto the article receiver 50.

Figure 3:
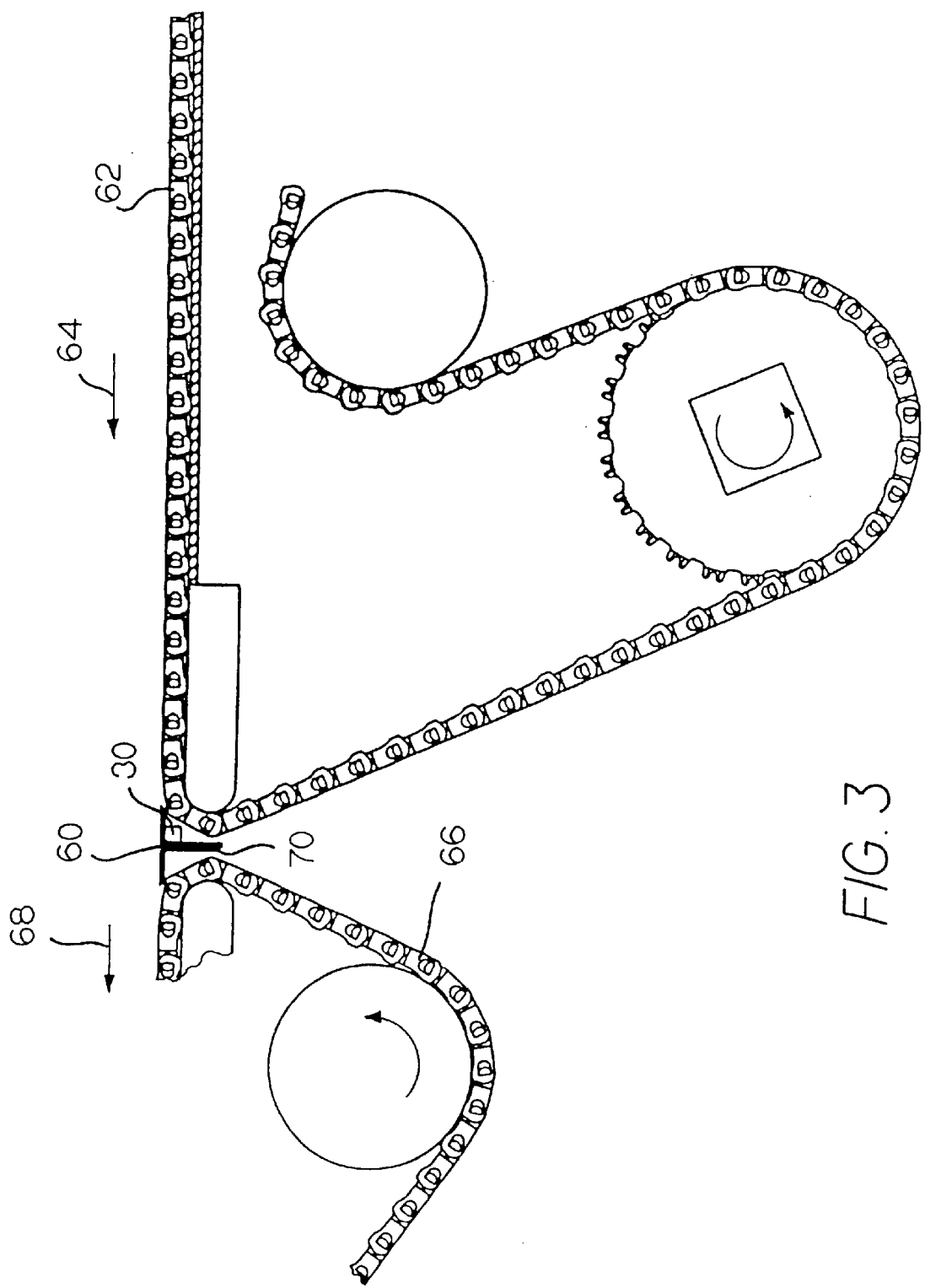
FIG. 3 is a side elevation view of yet another article-transfer mechanism as in FIG. 1 in an arrangement with two conveyor belts and a nosebar.

The self-clearing article-transfer mechanism can also take the form of the nosebar deadplate 60 shown in FIG. 3. In this example, an upstream conveyor belt 62 feeds a stream of articles in the direction of arrow 64 toward a downstream article-receiving takeaway belt 66 traveling in the same direction according to arrow 68. The nosebar deadplate 60 is positioned in the gap 70 between the belts. The nosebar deadplate is outfitted with a vibrator 30 that is used as in FIGS. 1 and 2 to vibrate the deadplate when the supply of articles ceases to urge the remaining articles along the deadplate 60 to the article-receiving belt 68.

Thus, the invention has been described with respect to various specific versions of article-transfer mechanisms and conveyor configurations. Even so, those skilled in the art will appreciate that other versions are possible without materially departing from the novel teachings and advantages of the invention. The top surface of the plate, instead of being smooth as in the drawings, could, for example, be textured with a grain in the direction of product flow or stepped from a higher level at the upstream end than at the downstream end to aid in product advancement. As another example, vibrators other than pneumatically controlled, such as magnetic, electric, and hydraulic vibrators could be used. The vibrator could alternatively be arranged to vibrate the plate in directions other than in the direction of article flow or up and down. Multiple vibrators could be arranged on the plate support to provide various vibration amplitude, direction, and frequency characteristics tailored to the mass and geometry of the article-transfer plate and the characteristics of the articles. As the examples suggest, these and other modifications are intended to be included within the scope of the invention as defined in the following claims.

What is claimed is:

1. A self-clearing article-transfer mechanism for transferring articles from an upstream article feeder to a downstream article receiver, the article-transfer mechanism comprising:

a plate extending from a first end to a second end and disposed between the upstream article feeder and the downstream article receiver with the first end proximate the article feeder and the second end proximate the article receiver to receive articles pushed onto and across the plate from the first end toward the second end by the backpressure of a stream of articles fed by the upstream article feeder and to transfer the stream of articles across the second end to the downstream article receiver; and a vibrator coupled to the plate to urge articles at the end of the stream across the plate from the first end to the second end and onto the downstream article receiver in the absence of sufficient backpressure wherein during one mode of operation, the vibrator can be deactuated to not operate when sufficient backpressure is present to urge the articles across the plate.

2. A self-clearing article-transfer mechanism as in claim 1 wherein the first end of the plate is disposed at a higher elevation than the second end of the plate.

3. A self-clearing article-transfer mechanism as in claim 2 wherein the plate is disposed at an angle of about 3° off horizontal.

4. A self-clearing article-transfer mechanism as in claim 1 wherein the vibrator vibrates the plate in the direction of flow of the stream of articles between the first end and the second end of the plate.

5. A self-clearing article-transfer mechanism as in claim 1 wherein the vibrator vibrates the plate up and down.

6. A self-clearing article-transfer mechanism as in claim 1 wherein the vibrator is actuated only when the upstream article feeder is not feeding articles.

7. A self-clearing article-transfer mechanism as in claim 1 wherein the vibrator is pneumatically driven.

8. A conveyor system, comprising:

a conveyor belt supplying a stream of articles from an upstream location;

a downstream article receiver; and an article-transfer mechanism disposed between the upstream conveyor belt and the downstream article receiver and including:

a plate for receiving the stream of articles from the conveyor belt and transferring the stream of articles to the article receiver by the backpressure of the stream of articles supplied by the conveyor belt; and a vibrator coupled to the plate to vibrate the plate urging articles at the end of the stream across the plate and onto the downstream article receiver to avoid stranding articles on the plate in the absence of sufficient backpressure wherein during one mode of operation, the vibrator can be deactuated to not operate when sufficient backpressure is present to urge the articles across the plate.

9. A conveyor system as in claim 8 wherein the plate is disposed at an angle of about 3° off horizontal.

10. A conveyor system as in claim 8 wherein the vibrator vibrates the plate in the direction of flow of the stream of articles between the first end and the second end of the plate.

11. A conveyor system as in claim 8 wherein the vibrator vibrates the plate up and down.

12. A conveyor system as in claim 8 wherein the vibrator is actuated only when the upstream conveyor belt is not supplying articles.

* * * * *